(12) United States Patent
Chen et al.

(10) Patent No.: US 7,428,638 B1
(45) Date of Patent: Sep. 23, 2008

(54) ARCHITECTURE FOR MANUFACTURING AUTHENTICATABLE GAMING SYSTEMS

(75) Inventors: Ling Tony Chen, Bellevue, WA (US); Boyd C. Multerer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 17 days.

(21) Appl. No.: 11/275,645

(22) Filed: Jan. 20, 2006

Related U.S. Application Data

(63) Continuation-in-part of application No. 11/047,177, filed on Jan. 31, 2005, which is a continuation of application No. 10/011,253, filed on Nov. 13, 2001, now Pat. No. 7,203,835.

(51) Int. Cl.
*H04K 1/00* (2006.01)
*H04L 9/00* (2006.01)

(52) U.S. Cl. .................. 713/168; 380/251; 380/259
(58) Field of Classification Search ............. 713/168; 380/282, 251, 259; 463/36
See application file for complete search history.

(56) References Cited

U.S. PATENT DOCUMENTS

| | | | |
|---|---|---|---|
| 4,296,476 A | 10/1981 | Mayer et al. |
| 4,432,067 A | 2/1984 | Nielsen |
| 4,905,280 A | 2/1990 | Wiedemer |
| 5,382,983 A | 1/1995 | Kwoh et al. |
| 5,393,072 A | 2/1995 | Best |
| 5,459,487 A | 10/1995 | Bouton |
| 5,475,835 A | 12/1995 | Hickey |
| 5,550,575 A | 8/1996 | West et al. |
| 5,551,701 A | 9/1996 | Bouton et al. |
| 5,557,541 A | 9/1996 | Schulhof et al. |
| 5,558,339 A | 9/1996 | Perlman |
| 5,592,651 A | 1/1997 | Rackman |
| 5,598,276 A | 1/1997 | Cookson et al. |
| 5,611,066 A | 3/1997 | Keele et al. |
| 5,634,849 A | 6/1997 | Abecassis |
| 5,649,862 A | 7/1997 | Sakaguchi et al. |
| 5,659,742 A | 8/1997 | Beattie et al. |
| 5,680,323 A | 10/1997 | Barnard |
| 5,706,510 A | 1/1998 | Burgoon |
| 5,716,273 A | 2/1998 | Yuen |

(Continued)

FOREIGN PATENT DOCUMENTS

CA 2201276 9/1998

(Continued)

OTHER PUBLICATIONS http://modchip.aeug.org/faq.html, year 1999, David Van Cleef).*

(Continued)

*Primary Examiner*—David Y Jung
(74) *Attorney, Agent, or Firm*—Lee & Hayes, PLLC

(57) ABSTRACT

An architecture is described to manufacture console-based gaming systems in a manner that allows them to be authenticated to a remote entity. The architecture involves creating a console public key and a console private key for each console-based gaming system. A digital certificate is created that contains the console public key and additional information about the console-based gaming system. The digital certificate is signed with a factory private key associated with the factory that manufactured the console-based gaming system.

12 Claims, 6 Drawing Sheets

U.S. PATENT DOCUMENTS

| | | | |
|---|---|---|---|
| 5,726,909 A | 3/1998 | Krikorian |
| 5,735,744 A | 4/1998 | Okamoto |
| 5,745,574 A | 4/1998 | Muftic |
| 5,752,883 A | 5/1998 | Butcher et al. |
| 5,791,992 A | 8/1998 | Crump et al. |
| 5,798,921 A | 8/1998 | Johnson et al. |
| 5,835,759 A | 11/1998 | Moore et al. |
| 5,841,979 A | 11/1998 | Schulhof et al. |
| 5,872,915 A | 2/1999 | Dykes et al. |
| 5,876,286 A | 3/1999 | Lee |
| 5,878,134 A | 3/1999 | Handelman et al. |
| 5,892,900 A | 4/1999 | Ginter et al. |
| 5,896,125 A | 4/1999 | Niedzwiecki |
| 5,915,238 A | 6/1999 | Tjaden |
| 5,917,256 A | 6/1999 | Broadbent, II |
| 5,918,223 A | 6/1999 | Blum et al. |
| 5,946,278 A | 8/1999 | Tower |
| 5,969,283 A | 10/1999 | Looney et al. |
| 5,973,683 A | 10/1999 | Cragun et al. |
| 5,978,920 A | 11/1999 | Lee |
| 5,980,261 A | 11/1999 | Mino et al. |
| 5,993,319 A | 11/1999 | Aoyama |
| 6,001,015 A | 12/1999 | Nishiumi et al. |
| 6,005,597 A | 12/1999 | Barrett et al. |
| 6,009,433 A | 12/1999 | Kurano et al. |
| 6,011,758 A | 1/2000 | Dockes et al. |
| 6,012,068 A | 1/2000 | Boezeman et al. |
| 6,022,274 A | 2/2000 | Takeda et al. |
| 6,025,869 A | 2/2000 | Stas et al. |
| 6,031,795 A | 2/2000 | Wehmeyer |
| 6,043,818 A | 3/2000 | Nakano et al. |
| 6,093,880 A | 7/2000 | Arnalds |
| 6,115,079 A | 9/2000 | McRae |
| 6,119,116 A | 9/2000 | Rose |
| 6,122,617 A | 9/2000 | Tjaden |
| 6,128,255 A | 10/2000 | Yankowski |
| 6,128,625 A | 10/2000 | Yankowski |
| 6,147,940 A | 11/2000 | Yankowski |
| 6,161,185 A | 12/2000 | Guthrie et al. |
| 6,181,336 B1 | 1/2001 | Chiu et al. |
| 6,189,096 B1 | 2/2001 | Haverty |
| 6,224,485 B1 | 5/2001 | Dickinson et al. |
| 6,230,320 B1 | 5/2001 | Gakumura |
| 6,280,327 B1 | 8/2001 | Leifer et al. |
| 6,280,329 B1 | 8/2001 | Kondo et al. |
| 6,292,892 B1 | 9/2001 | Davis |
| 6,298,441 B1 | 10/2001 | Handelman et al. |
| 6,299,535 B1 | 10/2001 | Tanaka |
| 6,309,301 B1 | 10/2001 | Sano |
| 6,312,336 B1 | 11/2001 | Handelman et al. |
| 6,320,320 B1 | 11/2001 | Bailey, III et al. |
| 6,393,430 B1 | 5/2002 | Van Ryzin |
| 6,396,531 B1 | 5/2002 | Gerszberg et al. |
| 6,464,585 B1 | 10/2002 | Miyamoto et al. |
| 6,468,160 B2 | 10/2002 | Eliott |
| 6,520,890 B2 | 2/2003 | Hsu |
| 6,535,269 B2 | 3/2003 | Sherman et al. |
| 6,540,614 B1 | 4/2003 | Nishino et al. |
| 6,564,056 B1 * | 5/2003 | Fitzgerald ................... 340/5.1 |
| 6,599,194 B1 | 7/2003 | Smith et al. |
| 6,601,171 B1 | 7/2003 | Carter et al. |
| 6,712,704 B2 | 3/2004 | Eliott |
| 6,716,102 B2 | 4/2004 | Whitten et al. |
| 6,769,989 B2 | 8/2004 | Smith et al. |
| 6,875,021 B2 | 4/2005 | Okamoto |
| 6,928,433 B2 | 8/2005 | Goodman et al. |
| 6,935,952 B2 | 8/2005 | Walker et al. |
| 7,126,584 B1 | 10/2006 | Nishiumi et al. |
| 7,218,739 B2 | 5/2007 | Multerer et al. |
| 2001/0004609 A1 | 6/2001 | Walker et al. |
| 2002/0071557 A1 | 6/2002 | Nguyen |
| 2002/0077177 A1 | 6/2002 | Elliott |
| 2002/0121297 A1 | 9/2002 | Li et al. |
| 2002/0152377 A1 | 10/2002 | Bauman et al. |
| 2003/0008715 A1 | 1/2003 | Huber et al. |
| 2003/0078097 A1 | 4/2003 | Okamoto |
| 2003/0227473 A1 | 12/2003 | Shih et al. |
| 2004/0005924 A1 | 1/2004 | Watabe et al. |
| 2004/0162137 A1 | 8/2004 | Eliott |

FOREIGN PATENT DOCUMENTS

| | | |
|---|---|---|
| DE | 10046437 | 4/2002 |
| EP | 0762260 | 3/1997 |
| EP | 0809214 | 11/1997 |
| EP | 0889420 | 1/1999 |
| EP | 0998966 | 5/2000 |
| EP | 1035706 | 9/2000 |
| EP | 1126425 | 8/2001 |
| FR | 2743434 | 7/1997 |
| JP | 64010467 | 1/1989 |
| JP | 3135636 | 6/1991 |
| JP | 0661390 | 8/1994 |
| JP | 06301609 | 10/1994 |
| JP | 7160467 | 6/1995 |
| JP | 7249283 | 9/1995 |
| JP | 8016554 | 1/1996 |
| JP | 10243015 | 9/1998 |
| JP | 10260939 | 9/1998 |
| JP | 10327147 | 12/1998 |
| JP | 11207034 | 8/1999 |
| JP | 11237941 | 8/1999 |
| JP | 11317061 | 11/1999 |
| JP | 2000070547 | 3/2000 |
| JP | 2000107424 | 4/2000 |
| JP | 2000149386 | 5/2000 |
| JP | 2000157724 | 6/2000 |
| JP | 2000228051 | 8/2000 |
| JP | 2000511378 T | 8/2000 |
| JP | 2000348466 | 12/2000 |
| JP | 2001058087 | 3/2001 |
| JP | 01201746 | 7/2001 |
| JP | 2001325134 | 11/2001 |
| JP | 07039649 | 2/2007 |
| WO | WO9714151 | 4/1997 |
| WO | WO9746016 | 12/1997 |
| WO | WO9856179 | 12/1998 |
| WO | WO0033572 | 6/2000 |
| WO | WO0040027 | 7/2000 |
| WO | WO0051036 | 8/2000 |
| WO | WO0105477 | 1/2001 |
| WO | WO0108148 | 2/2001 |
| WO | WO0184768 | 11/2001 |

OTHER PUBLICATIONS http://www.sun.com/blueprints/0801/publickey.pdf, online 2001, published 1999.*
SegaNet—Wikipedia; printed out 2008.*
Download details_Channel 9 Boyd Multerer; printed out year 2008.*
Login to Internet Websites by Next Generation Game Console Mohammad Shirali-Shahreza; Internet, 2006 2nd IEEE/IFIP International Conference in Central Asia on Sep. 2006 pp. 1-4.*
Evolutions in Gaming Voth, D.; Pervasive Computing, IEEE vol. 6, Issue 2, Apr.-Jun. 2007 pp. 7-10.*
Xbox Live—Wikipedia; printed out year 2008.*
History of massively multiplayer online games—Wikipedia; printed out year 2008.*
U.S. Appl. No. 60/201,163, filed May 2, 2000, Shih, et al., "Real Time Incorporation of Personalized Audio into Video Game".
U.S. Appl. No. 60/252,760, filed Nov. 22, 2000, Shih, et al., "Real Time Incorporation of Personalized Audio into Video Game".

"CES: Bill Gates zeigt die Xbox" Golem.de 'Online! Jan. 6, 2000 Retrieved from the internet: url:http://dyn1.golem.de/cgi-bin/usisapi.dl1/forprint??id11561] retrieved Jun. 18, 2004.

"Dex Drive Manual", gameshark, 1998, retrieved from <<http://www.angelfire.com/games/winospsxdexdrive/dexdrive.pdf>>, pp. 1-15.

"DFU Verigindung herstellen" FAQ, 2000, retrieved from <<www.puretec.de>>, 1 page.

UK Patent GB 2276971, Application 9404818.8, filed Mar. 11, 1994, Tashiro, et al., "Karaoke System Having Playback and Synthetic Sound Sources".

"Getting Started Windows98, 2nd Edition", Microsoft Corporation, pp. 80-81 and 87-90.

Gordon, "Interviews—John Gildred of Indrema on the L600", Planet GeForce website, Oct. 19, 2000, 5 pages.

Hall, et al., "Remote Electronic Gambling", Computer Security Applications Conference, 1997. Proceedings 13th Annual, Dec. 8-12, 1997 pp. 232-238.

"IGN64's Ultimate 64DD FAQ-Everything you ever wanted to know about the upcoming disk drive add-on", IGN.com, Dec. 15, 1999, 12 pages.

Jimbo, et al., "Optimal Authentication Systems and Combinatorial Designs", IEEE Transactions on Information Theory, vol. 36, Issue 1, Jan. 1990, pp. 54-62.

Lehrbaum, "Linux Fuels Game Console Plus", ZDNetUK News, Jul. 6, 2000, retrieved on Apr. 14, 2005 from <<http://news.zdnet.com/2100-9595_22-502604.html?tag=st.prev>>, 2 pages.

"Links 386CD Players Manual", 1995 Access Software, Inc., pp. 1-87.

"Metropolis Street Racer", retrieved at <<http://en.wikipedia.org/wiki/Metropolis_Street_Racer>>, on Jul. 9, 2006, Sega, Jan. 17, 2001, pp. 03.

"Metropolis Street Racer review", DailyRadar.com, Jan. 13, 2000, 5 pages.

Mowatt, "Indrema: Linux-Based Console", CNET Gamecenter.com, Aug. 11, 2000, 2 pages.

Nacira, et al., "Secured Net-Banking by /spl thera/-VIGENERE in Syverson's Protocol", Computer Systems and Applications, 2005, The 3rd ACS/IEEE International Conference 2005, 6 pages.

Perenson, "Play Back Media Your Way" PC World website, Jun. 1, 2000, retrieved on Jul. 8, 2004 from <<http://www.pcworld.com/resource/printable/Oaid1700100.asp>>, 2 pages.

"PlayStation 2 Instruction Manual", 2000 Sony Computer Entertainment, retrieved on Jun. 18, 2004 from <<www.playstation.com>>, 28 pages.

"PlayStation 2, Dreamcast, and 64DD: Aiming at Increasing Customers by Integration with the Net", Nikkei Trendy, No. 169, Japan, Nikkei Home Publishing Inc., Jul. 25, 2000, Extra Edition/Serial No. 169, pp. 16-19.

"PS2 Frequently Asked Questions" All Playstation2 website, Jul. 29, 2000, retrieved on Jun. 18, 2004 from <<http://www.allps2.net/ps2_faq.html>>, 7 pages.

Quinlan, "Filesystem Hierarchy Standard—Version 2.0",Oct. 26, 1997, retrieved on Nov. 18, 2004 from <<http://www.lisoleg.net/lisoleg/fs/fhs.pdf>>, pp. 1-35.

Schneier, "Applied Cryptography," John Wiley & Sons, Second Edition, 1996, pp. 32 and 33.

Schneier, "Applied Cryptography", Applied Cryptography. Protocols, Algorithms and Source Code in C, New York, John Wiley & Sons, US, 1996, pp. 574-577.

Sherman, et al., "Secure Network Access Using Multiple Applications of AT&T's Smart Card", AT&T Technical Journal, American Telephone and Telegraph Co. New York, US, vol. 73, No. 5, Sep. 1, 1994, pp. 61-72.

Stallings, "Cryptography and Network Security: Principles and Practice", Second Edition, Prentice Hall, 1999, pp. 330 and 333-338.

Suarez, "Sony PlayStation 2"(review), The Digital Bits, Nov. 15, 2000 retrieved on Jun. 18, 2004 from <<http://www.thedigitalbits.com/reviews/ps2/sonyps2*.html>>, 7 pages.

Takahashi, "Microsoft goes gaming. (product Development)", Electronic Business, May 2000, 2 pages.

"The 64DD Connection-Here's How the 64DD and the Nintendo 64 Connect", IGN Staff, IGN.com, Oct. 20, 1999, 4 pages.

"The 64DD: Nintendo's Disk Drive—Everything you ever wanted to know about the N64's first major add-on", IGN.com, Jan. 28, 1997, 7 pages.

Thurrott, "Windows Media Player 7 reviewed" Supersite for Windows, Aug. 15, 2000, Retrieved on Jun. 18, 2004 from <<http://www.winsupersite.com/reviews/wmp7.asp>>, 5 pages.

"TV Incapable of Displaying Images", Nikkei Electronics, Japan, Nikkei Business Publications, Inc., May 22, 2000, No. 770, pp. 141-158.

"US version of Playstation2 to have modem hard drive", c/net News.com, By Bloomberg News, Apr. 14, 2000, 2 pages.

"User Manual: Metropolis Street Racer", Sega Enterprises, game 2000, 18 pages.

"What is the 64DD?", IGN.com, Sep. 17, 1997, 9 pages.

PCT Application No. PCT/US01/14106, filed May 2, 2001, Shih, et al., "Real Time Audio in Video Game".

PCT Application No. PCT/US2005/032832, filed Sep. 15, 2005, Bonney, et al., "Virtual Radio in Wagering Game Machine".

"Xbox to Deliver Ultimate Console Gaming Experience" Press Pass, San Jose Ca Mar. 10, 2000 3 pages 2001.

"XBOX, ASCII, the March Issue, 2001 (The Anatomy of XBOX which is Inaccessable to the Readers of Game Magazines: The Latest Information of the War for TV Viewers at the Present Stage in 21st Century", ASCII Corporation., Mar. 1, 2001, vol. 25, No. 3, pp. 249-264.

Bolosky et al., "Single Instance Storage in Windows 2000" Proceedings of the Usenix Windows Systems Symposium, vol. 4, Aug. 3, 2000, pp. 13-21.

"Sega Dreamcast User Manual", retrieved on Oct. 16, 2006 at <<http://www.gamemanuals.net/download/11feed12c65503f83e99b0c58bd7450bd/Dreamcast_(EN)_[Hardware].pdf>>, The Game Manual, Sep. 9, 1999, pp. 2-31.

Kasahara, "Follow-up Report! Operational Verification of Pentium III-compatible Application & Compatible Chip Mother," DOS/V Magazine, Softbank Publishing Inc., May 1, 1999, vol. 8, No. 9, pp. 130-137.

Official Notice of Rejection for Japanese patent application No. 2006-172872 mailed on Sep. 14, 2007, 8 pgs.

Gong, "Enclaves: Enabling Secure Collaboration Over the Internet", IEEE Journal on Selected Areas in Communication, vol. 15, No. 3, Apr. 1997, pp. 567-575.

"Exploring Reality of X-Box Microsoft Game Machine", Personal Computer Journal "Monthly ASCII", Japan, ASCII Corporation, May 1, 2000, vol. 24/No. 5/Serial vol. No. 275, pp. 204-209, ISSN-0386 to 5428.

"Invisible Television", Nikkei Electronics, Japan, Nikkei BP Inc. May 22, 2000, No. 770, pp. 141-158.

Official Notice of Rejection for Japanese patent application No. 2002-066040 mailed on Mar. 24, 2006, 13 pgs.

Official Notice of Rejection for Japanese patent application No. 2002-064294 mailed on Mar. 24, 2006, 16 pgs.

Menezes, et al., "Handbook of Applied Cryptography", CRC Press LLC, 1997, p. 397.

Moda, "X-Box: Looking into the Nature of Microsoft's Game Machine", ASCII, Japan, ASCII Corporation, May 1, 2000, vol. 24, No. 5, pp. 204-209.

"This simplifies Hard Disk", ASCII, Japan, ASCII Corporation, Apr. 1, 1991, vol. 15, No. 4, pp. 250-257.

European Search Report for European Patent Application No. 02025093.2 Mailed on May 15, 2006, 7 pgs.

Official Notice of Rejection for Japanese Patent Application No. 2002-064293 Mailed on Apr. 25, 2008, 12 pgs.

Tyson, "How BIOS Works," retrieved at <<http://web.archive.org/web/20030412194913/http:/computer.howstuffworks.com/bios.ht>> on Jan. 3, 2008, published Apr. 12, 2003, pp. 1-3.

* cited by examiner

ARCHITECTURE FOR MANUFACTURING AUTHENTICATABLE GAMING SYSTEMS

RELATED APPLICATION

This application is a Continuation in Part of co-pending application Ser. No. 11/047,177, filed Jan. 31, 2005, entitled "Architecture for Manufacturing Authenticatable Gaming Systems", and incorporated herein by reference. That application is a Continuation of U.S. patent application Ser. No. 10/011,253, filed Nov. 13, 2001, entitled "Architecture for Manufacturing Authenticatable Gaming Systems".

TECHNICAL FIELD

This invention relates to console-based gaming systems, and more particularly, to systems and methods for manufacturing game consoles that can be authenticated for participation in services such as online gaming.

BACKGROUND

Traditionally, gaming systems with a dedicated console were standalone machines that accommodated a limited number of players (e.g., 4). PC-based gaming grew in popularity in part due to the ability to play games online with many remote players over a network (e.g., the Internet). Thus, one trend for dedicated gaming systems is to provide broadband capabilities to facilitate online gaming.

Creating an online gaming architecture for dedicated consoles poses several unique and difficult problems. One problem is that there are a number of hackers that constantly attempt to cheat during online games to gain various gaming advantages. To defeat this cheating, various security schemes are deployed to protect the data being transmitted over the network from hacker observation and/or modification. Such schemes, however, require the game console to authenticate itself with a remote entity (e.g., online gaming server, registration server, other player system, etc.). Valid credentials are used during authentication to guarantee authenticity of network traffic during gaming. If these credentials could be easily obtained during registration, a hacker could easily manipulate the credentials and forge all network packets from the video game console using another computer. From the game server's perspective, the gaming packets appear to be authentic since they came from a network source that was capable of providing the required credentials.

Accordingly, to secure online gaming and other services, there is a need to prevent hackers from easily obtaining valid credentials for purposes of cheating or other improper uses.

SUMMARY

An architecture for manufacturing console-based gaming systems involves creating a console private key and a console public key associated with each console-based gaming system. The console private key is stored in the console-based gaming system and the console public key is made available to the general public. A digital certificate is created that contains the console public key and a serial number associated with the console-based gaming system. The digital certificate is signed using a factory private key associated with the factory that manufactured the console-based gaming system. The digital certificate is used by other devices and/or entities to authenticate the console-based gaming system and to authenticate data generated by the console-based gaming system.

DETAILED DESCRIPTION

The following discussion is directed to console-based gaming systems with online connectivity and techniques for manufacturing such gaming systems in a manner that they can be authenticated by a remote authentication entity over an open network, such as the Internet. The techniques address the problem of how the authentication entity can be assured that the entity on the other side of the network is an authorized gaming system.

The discussion assumes that the reader is familiar with basic cryptography principles, such as encryption, decryption, authentication, hashing, digital signatures, and digital certificates. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Gaming System

Figure 1:
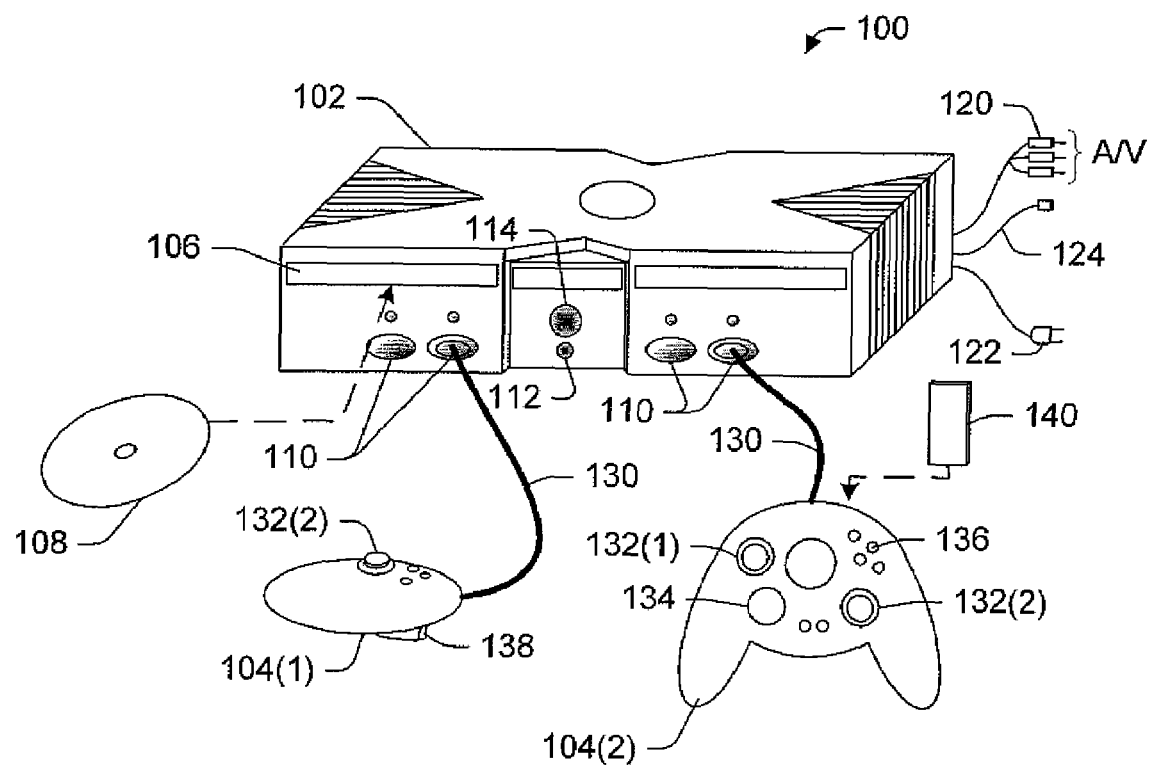
FIG. 1 illustrates an example gaming system with a game console and one or more controllers.

FIG. 1 shows an exemplary gaming system 100 (also referred to as a console-based gaming system). It includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller is configured to accommodate two memory units 1140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD discs, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
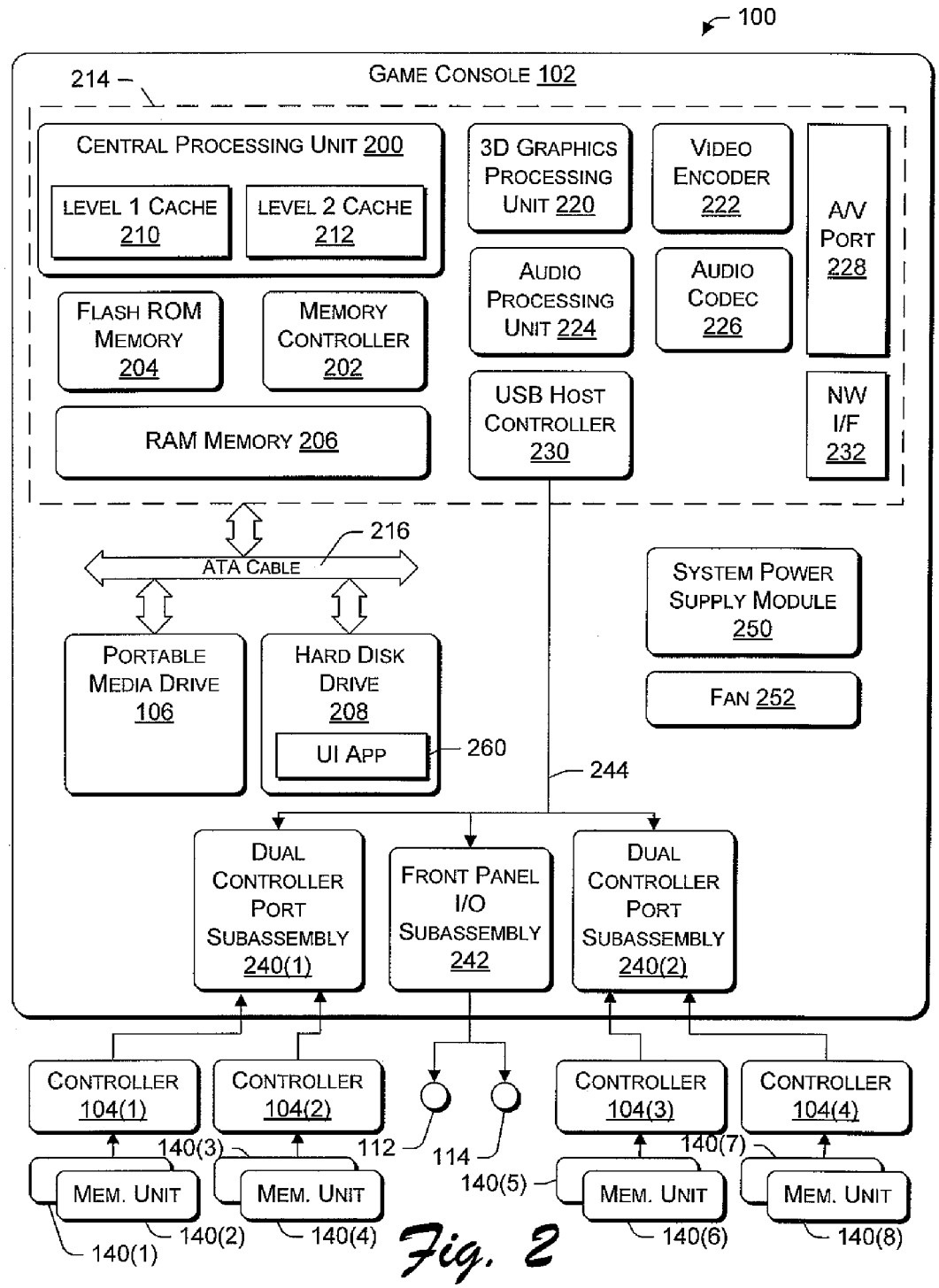
FIG. 2 is a block diagram of the example gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored on the hard disk drive 208 that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Network Gaming

Figure 3:
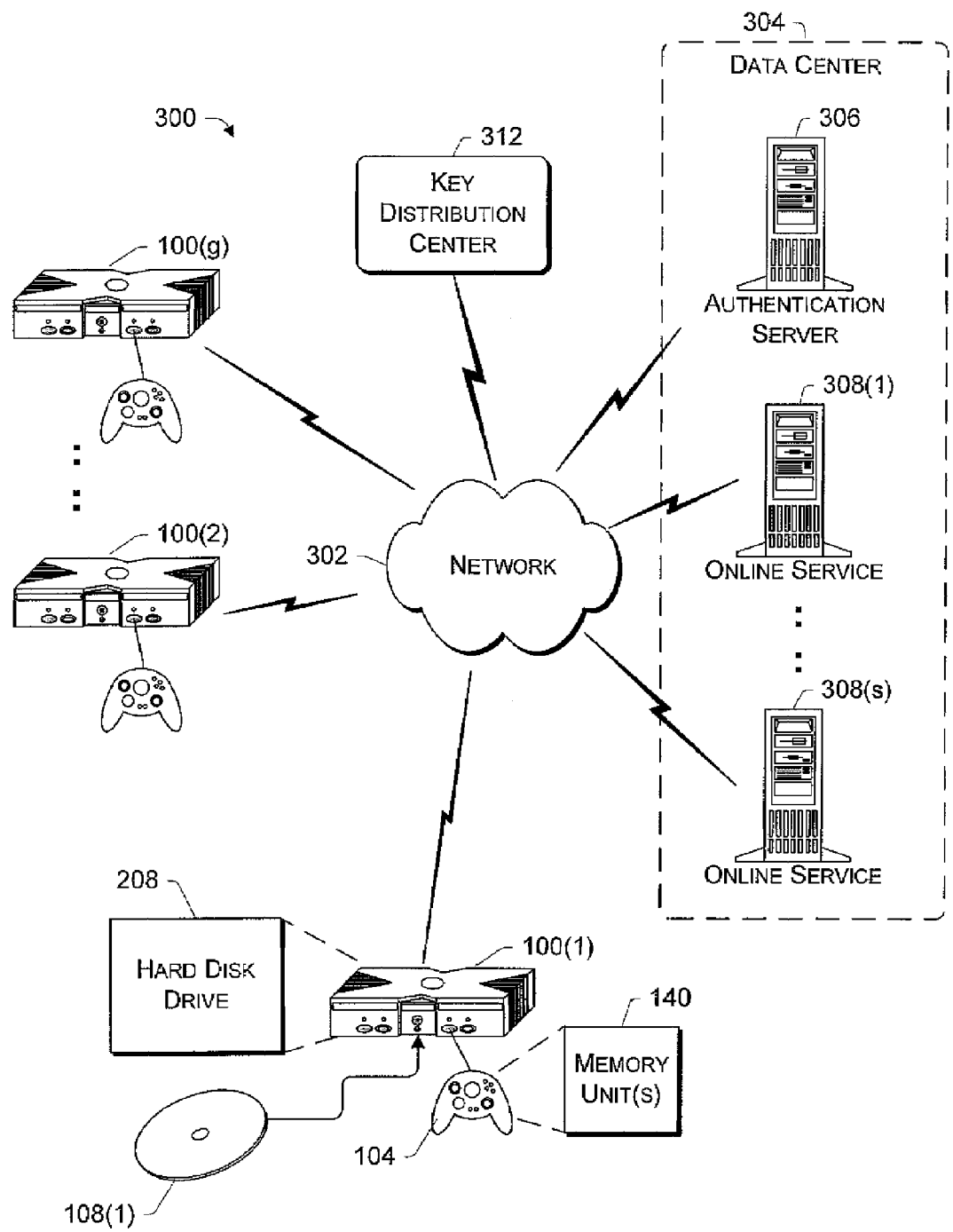
FIG. 3 illustrates an example network gaming system in which the FIG. 1 gaming system is connected via a network to other consoles, services, and a ticket issuing entity.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more data centers may be accessible via the network 302 to provide various services for participants. An exemplary data center 304 is illustrated as comprising an authentication server 306 that registers individual gaming systems 100 and one or more online servers 308(1), . . . , 308(s) to provide various services, such as hosting online games, serving downloadable music or video files, hosting gaming competitions, serving streaming audio/video files, and the like.

While the authentication server 306 and online servers 308 are logically grouped as forming the data center 304, it is noted that the various computer systems may or may not be physically located together or as part of the same facility. Additionally, while the authentication server 306 is illustrated separately from the online servers 308, the authentication functionality may be integrated as part of the services.

The network gaming environment 300 may further involve an optional key distribution center 312 that plays a role in authenticating individual players and/or gaming systems 100 to one another as well as online services 304. The distribution center 312 distributes keys and service tickets to valid participants that may then be used to form games amongst multiple players or to purchase services from the online services 308. The key distribution center 312 may be integrated into the data center 304 or reside independently, as shown.

To participate in online gaming (or other network services), the gaming systems 100 first seek to be authenticated by the authentication server 306. To grant permission to participate in online services, the authentication server 306 needs to trust that each gaming system is genuine and not an imposter computing device. Example techniques for manufacturing gaming systems that can be authenticated for online gaming over an open network, such as the Internet, are described below.

Once authenticated, the gaming systems can participate in online gaming or other services, or proceed to authenticate individual users with the key distribution center. A multi-user authentication architecture is described in more detail in U.S. patent application Ser. No. 09/802,795, entitled "Multiple User Authentication for Online Console-Based Gaming", which was filed Mar. 9, 2001. This application is assigned to Microsoft Corporation and is hereby incorporated by reference herein.

Authenticatable Gaming Systems

An architecture for manufacturing gaming systems is provided to address the console authentication problem. Simply stated, the problem is how a device or entity (such as an authentication entity) can be assured that the entity on the other side of the network is an authentic game console.

A particular cryptographic system described herein uses two keys, a public key and a private key (also referred to as a secret key). The public key is generally known to the public while the private key is maintained in secrecy. Using this cryptographic system, data is signed by the private key. A recipient of the data then uses the corresponding public key to verify the signature of the data to confirm that it has not been tampered with. Generally, the public key is used for verifying signed data and the private key is used for signing data.

Figure 4:
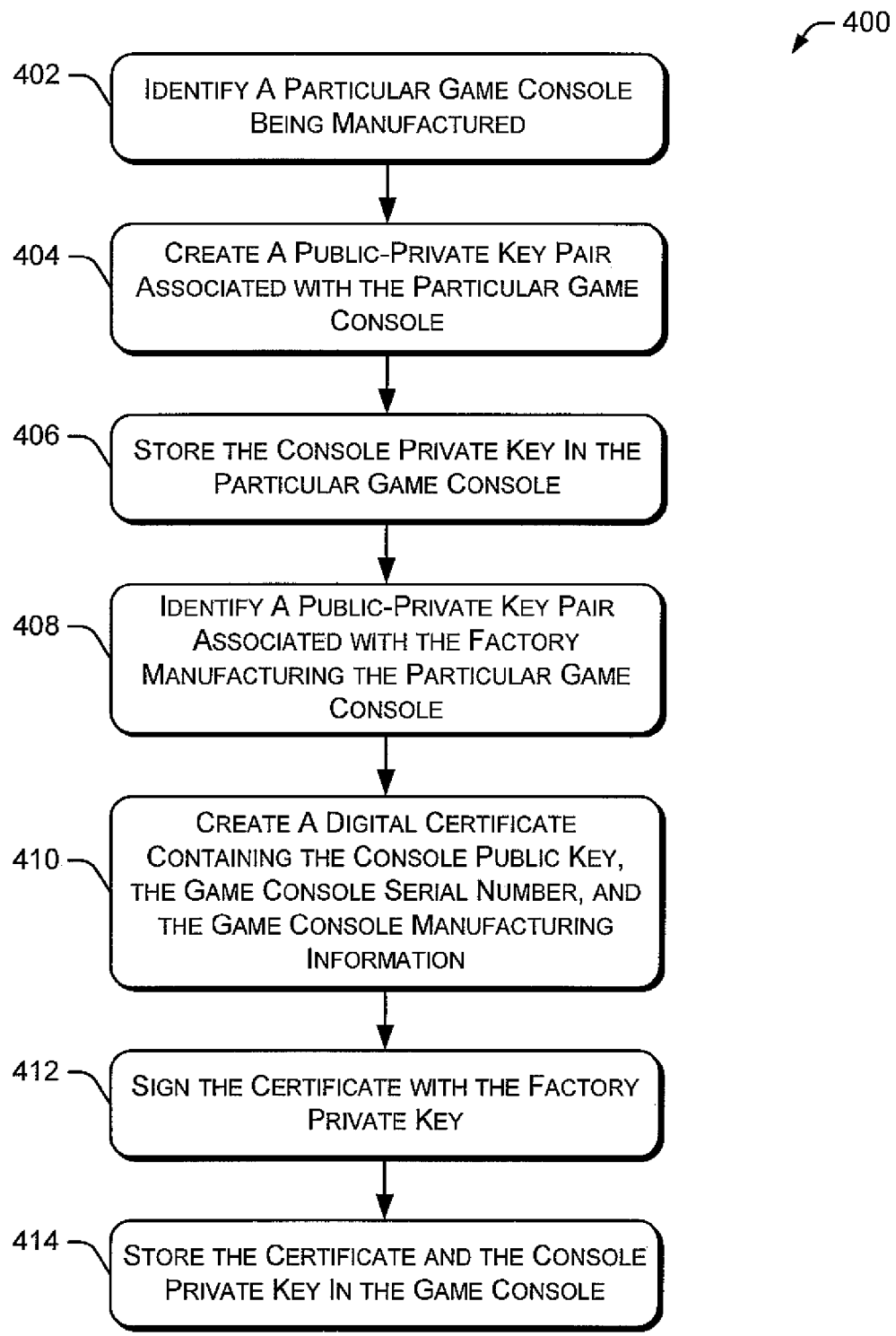
FIG. 4 illustrates an example procedure for manufacturing a game console having an associated public-private key pair.

FIG. 4 illustrates an example procedure 400 for manufacturing a game console having an associated public-private key pair. The public key is also referred to as the console public key and identified using the following notation: Kconsole_pub. The private key is also referred to as the console private key and identified using the following notation: Kconsole_prv.

Procedure 400 identifies a particular game console being manufactured (block 402). For example, the particular game console being manufactured (or already manufactured) can be identified by the console serial number or similar identifier. The procedure then creates a public-private key pair associated with the particular game console (block 404). As mentioned above, the public-private key pair includes a console public key (Kconsole_pub) and a console private key (Kconsole_prv).

The console private key is stored in the particular game console (block 406). It is desirable to store the console private key in the game console in a secure manner such that game console users cannot identify or obtain the console private key. In one embodiment, the console private key is stored in the game console by blowing multiple fuses in the CPU (central processing unit) contained in the game console. The particular pattern of fuses blown in the CPU indicates the values contained in the console private key. Alternate embodiments may utilize a "smart chip" or similar device that securely stores the console private key or stores values that are used to generate the console private key.

Procedure 400 continues by identifying a public-private key pair associated with the factory manufacturing the particular game console (block 408). The public-private key pair includes a factory public key (Kfactory_pub) and a factory private key (Kfactory_prv). The factory public key is available to the public. The factory private key is stored by the game console manufacturer in a secure manner and access to the factory private key is limited to prevent distribution of the factory private key to the public.

The procedure continues by creating a digital certificate containing the console public key, the game console serial number, and the game console manufacturing information (block 410). A digital certificate is used to authenticate a user or device sending a message or request to another device or entity. The game console manufacturing information includes, for example, manufacturing date, game console version, types of storage devices contained in the game console, and the like. This game console manufacturing information may be of interest to other systems in determining, for example, whether the game console can execute certain application programs or support certain online gaming features. The certificate is signed with the factory private key (block 412). Since the certificate is signed with the factory private key, a recipient of the certificate can authenticate the certificate using the known factory public key. After the certificate is authenticated, the recipient of the certificate knows that the data contained in the certificate (console public key, console serial number, etc.) is valid. Thus, the certificate can be authenticated by any device using the known factory public key. Finally, procedure 400 stores the certificate and the console private key in the game console (block 414).

Figure 5:
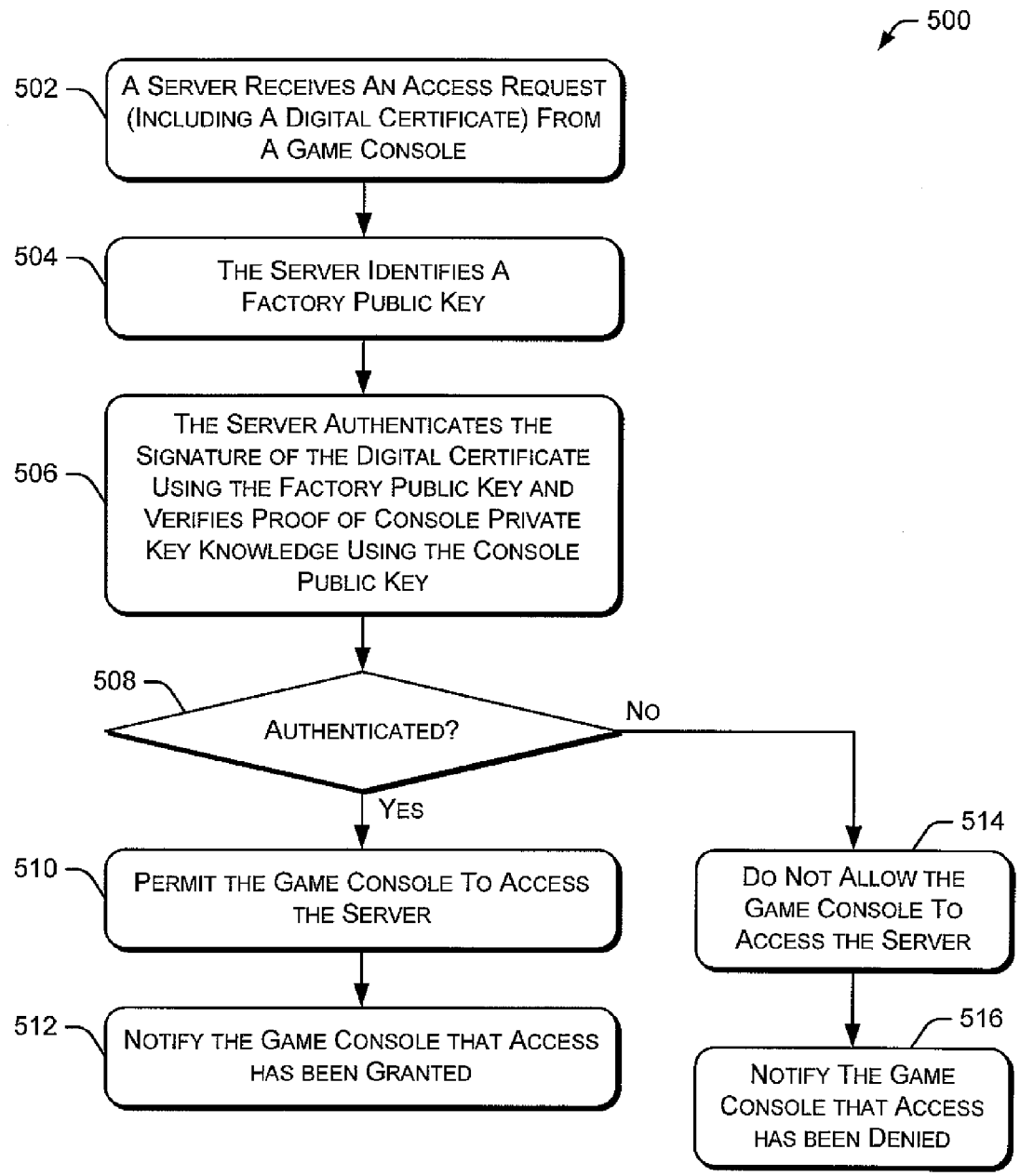
FIG. 5 illustrates an example procedure 500 for authenticating a game console to another entity.

FIG. 5 illustrates an example procedure 500 for authenticating a game console to another entity, such as a server, that supports one or more online services. Initially, a server receives an access request from a game console (block 502). The access request from the game console includes a digital certificate of the type discussed above with respect to FIG. 4. The server identifies a factory public key with which to authenticate the received digital certificate (block 504). The server then authenticates the signature of the digital certificate using the factory public key and then uses the console public key embedded in the certificate to verify proof of console private key knowledge (block 506). An example of a way to prove knowledge of the console private key is to sign the current time or a server-side challenge with the console private key. If the signature of the digital certificate and proof of console private key knowledge verifies correctly, the server permits the game console to access one or more services offered by the server (block 510) and notifies the game console that access has been granted (block 512). If the signature of the digital certificate or the proof of console private key knowledge is not authenticated, then the server does not allow the game console to access the server (block 514). Further, the server notifies the game console that access to the server has been denied (block 516). Thus, the game console can be authenticated by any device using the known factory public key. This authentication can occur without requiring the authenticating device to access a separate authentication server or access a database containing secret information, such as manufacturing secrets.

In many situations, a device may want to confirm that data stored by another device (such as saved game data stored by a game console) has not been altered since it was stored. To allow data to be authenticated, a game console may sign all data generated by a game console (including saved game data) using the console private key. For example, the data generated by the game console may be signed with the console private key and sent to an authenticating device along with the digital certificate discussed above with respect to FIG. 4. Another device can then authenticate the data by authenticating the digital certificate (using the factory public key) and verifying the certificate was truly signed by the factory private key.

Figure 6:
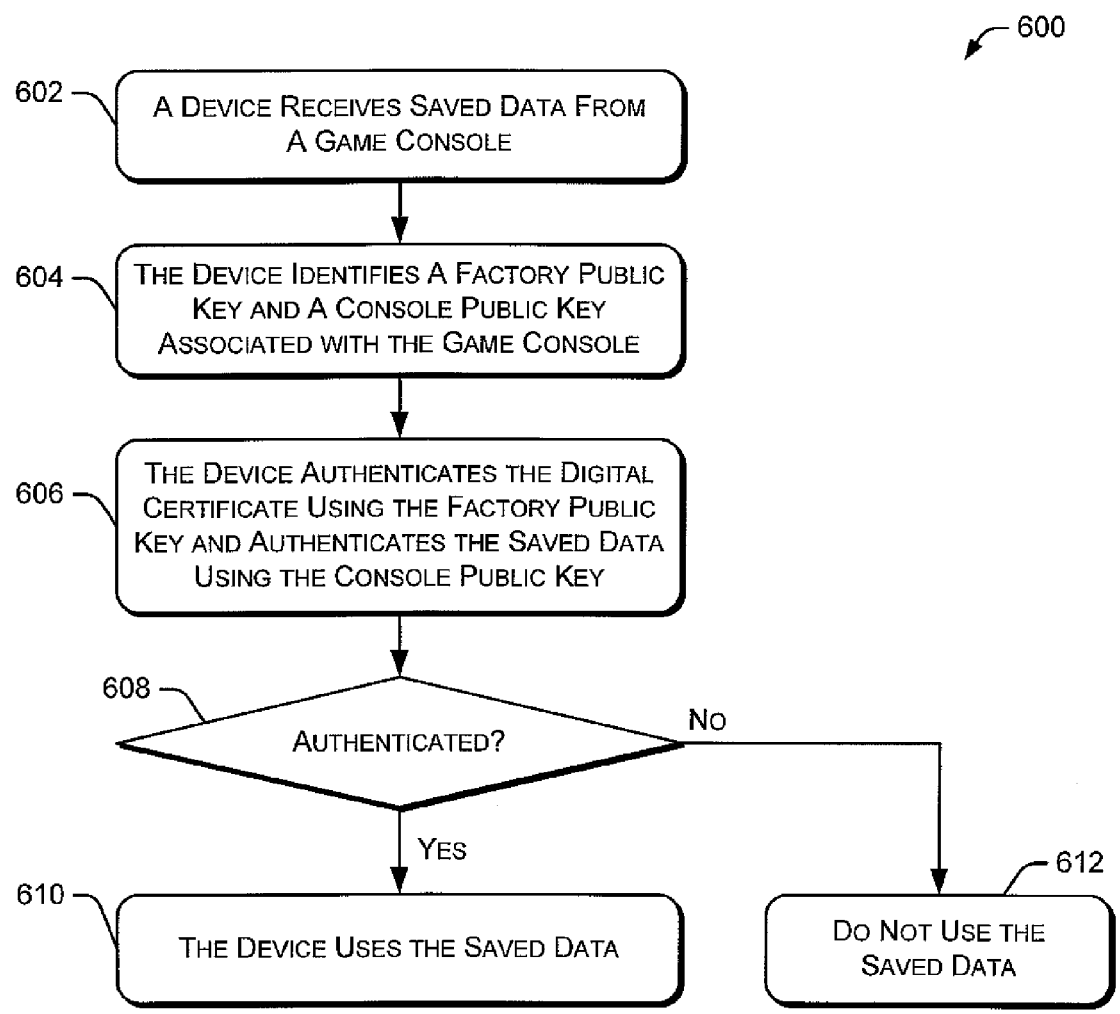
FIG. 6 illustrates an example procedure 600 for authenticating data saved by a game console to a storage device.

FIG. 6 illustrates an example procedure 600 for authenticating data saved by a game console to a storage device. Initially, a device (such as another game console) receives saved data from a game console (block 602). The device identifies a factory public key and a console public key associated with the game console (block 604). The device authenticates the digital certificate using the factory public key and authenticates the saved data using the console public key to verify that, for example, a one way hash (e.g. SHA1) of the saved data is correctly signed by the console private key (block 606). If the signature of the digital certificate is authenticated and the saved data is authenticated, the device uses the saved data (block 610). If the signature of the digital certificate is not authenticated and/or the saved data is not authenticated, then the server does not use the saved data (block 612). Thus, any device (such as a game console) can authenticate data saved by another game console without having to access an authentication server or access a database containing manufacturing secrets or other manufacturing data. For example, a game console user may store saved game data on a portable memory device and use that saved game data in a friend's game console. The friend's game console can authenticate the saved game data prior to allowing the saved game data to be used in that game console.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    manufacturing a console-based gaming system having at least programmatically accessible memory and network interfacing capability to enable access to a network;
    creating a console private key associated with the console-based gaming system;
    creating a console public key associated with the console-based gaming system;
    storing the console private key and the console public key in the console-based gaming system;
    identifying a factory private key associated with the factory manufacturing the console-based gaming system;
    identifying a factory public key associated with the factory manufacturing the console-based gaming system;
    creating a digital certificate containing the console public key;
    signing the digital certificate with the factory private key; and
    storing the certificate and the console private key in the console-based gaming system.

2. A method as recited in claim 1, wherein the digital certificate further contains a serial number associated with the console-based gaming system.

3. A method as recited in claim 1, wherein the digital certificate further contains manufacturing information associated with the console-based gaming system.

4. A method as recited in claim 1, further comprising communicating the digital certificate and a proof of console private key knowledge to a device that desires to authenticate the game console.

5. A method as recited in claim 1, further comprising communicating the digital certificate and a proof of console private key knowledge to another console-based gaming system.

6. A method as recited in claim 1, wherein the console private key is stored in the game console in a manner that prevents the extraction of the key.

7. A method to verify authenticity of saved data from a game console having at least programmatically accessible memory and network interfacing capability to enable access to a network, the method comprising:
    obtaining saved data from the game console along with a digital certificate and a one way hash of the saved data signed by a console private key, wherein the digital certificate includes a console public key and a game console serial number, and wherein the digital certificate is signed with a factory private key;
    identifying a factory public key associated with the factory private key;
    verifying the authenticity of the digital certificate using the factory public key; and
    verifying that the one way hash of the saved data is correctly signed by the console private key, wherein the corresponding console public key is contained in the digital certificate.

8. A method as recited in claim 7, further comprising permitting the game console to access the saved data if the saved data is authenticated.

9. A method as recited in claim 7, further comprising preventing the game console from accessing the saved data if the saved data is not authenticated.

10. A method as recited in claim 7, wherein the digital certificate further includes manufacturing information associated with the game console.

11. A method as recited in claim 7, wherein the method is performed by a device that desires to authenticate the saved data.

12. A method as recited in claim 7, wherein the method is performed by a second game console.

* * * * *